(12) United States Patent
Gabriel et al.

(10) Patent No.: US 10,997,977 B2
(45) Date of Patent: May 4, 2021

(54) HYBRID NLP SCENARIOS FOR MOBILE DEVICES

(71) Applicant: SAP SE, Walldorf (DE)

(72) Inventors: Jan Gabriel, Böhl-Iggelheim (DE); Sebastian Netuschil, Heidelberg (DE)

(73) Assignee: SAP SE, Walldorf (DE)

( * ) Notice: Subject to any disclaimer, the term of this patent is extended or adjusted under 35 U.S.C. 154(b) by 107 days.

(21) Appl. No.: 16/398,871

(22) Filed: Apr. 30, 2019

(65) Prior Publication Data
US 2020/0349934 A1  Nov. 5, 2020

(51) Int. Cl.
*G10L 15/22* (2006.01)
*G10L 15/30* (2013.01)
*G06F 40/30* (2020.01)

(52) U.S. Cl.
CPC ............ *G10L 15/22* (2013.01); *G06F 40/30* (2020.01); *G10L 15/30* (2013.01); *G10L 2015/223* (2013.01)

(58) Field of Classification Search
CPC ........ G06F 40/30; G06F 40/20; G06F 40/284; G06F 40/205; G06F 40/216; G06F 40/232; G06F 40/253; G06F 40/295; G06F 40/242; G06F 40/289; G06F 40/35; G06F 40/40; G06F 40/44; G06F 40/45; G06F 40/58; G06F 16/243; G06F 16/90332; G10L 15/16; G10L 15/22; G10L 13/00; G10L 15/08; G10L 15/30; G10L 2015/088; G10L 25/27; G10L 25/30; G10L 25/48; G10L 25/51; G10L 15/01; G10L 15/063; G10L 15/1807; G10L 15/183; G10L 15/19; G10L 15/26; G10L 2015/225; G06N 20/00; G06N 5/022; G06N 3/084; G06N 3/0472; G06N 3/08; G06N 3/04; G06N 3/0445; G06N 3/0454; G06N 5/02; G06N 5/04; G06N 3/063; G06N 5/025; G06N 7/005

USPC ........ 704/2, 7, 257, 9, 270, 270.1, 275, 231, 704/256; 706/14, 61

See application file for complete search history.

(56) References Cited

U.S. PATENT DOCUMENTS

| | | | | |
|---|---|---|---|---|
| 9,779,085 | B2 * | 10/2017 | Wick | G06F 40/242 |
| 9,786,277 | B2 * | 10/2017 | Rothwell | G06Q 10/10 |
| 9,811,519 | B2 * | 11/2017 | Perez | G10L 15/22 |
| 10,013,654 | B1 * | 7/2018 | Levy | G06N 3/08 |
| 10,402,752 | B2 * | 9/2019 | Ranzato | G06F 40/284 |
| 10,607,141 | B2 * | 3/2020 | Jerram | G10L 13/00 |
| 10,608,174 | B2 * | 3/2020 | Li | H01L 43/02 |

(Continued)

*Primary Examiner* — Vijay B Chawan
(74) *Attorney, Agent, or Firm* — Buckley, Maschoff & Talwalkar LLC

(57) ABSTRACT

A system and method include reception, from a remote system, of a trained natural language processing model implementing a dialog flow-based application, reception of input parameters from an operator while not in communication with the remote system, input of the input parameters to the model to initiate a transaction, storing of transaction data associated with the transaction in a local memory, determination that the mobile device is in communication with the remote system, transmission, in response to the determination, of the stored transaction data to the remote system, and reception, from the remote system, of an updated trained model based on the transmitted transaction data.

20 Claims, 6 Drawing Sheets

(56) References Cited

U.S. PATENT DOCUMENTS

| | | | |
|---|---|---|---|
| 2006/0206332 A1* | 9/2006 | Paek | G10L 13/00 |
| | | | 704/257 |
| 2006/0206333 A1* | 9/2006 | Paek | G10L 15/07 |
| | | | 704/260 |
| 2007/0185717 A1* | 8/2007 | Bennett | G06F 40/289 |
| | | | 704/270.1 |
| 2009/0083200 A1* | 3/2009 | Pollara | G06N 20/00 |
| | | | 706/14 |
| 2010/0042404 A1* | 2/2010 | Gupta | G10L 15/063 |
| | | | 704/9 |
| 2014/0278373 A1* | 9/2014 | Grove | G06F 40/40 |
| | | | 704/9 |
| 2015/0169549 A1* | 6/2015 | Das | G06F 40/45 |
| | | | 704/2 |
| 2018/0033434 A1* | 2/2018 | Rothwell | G06F 16/90332 |
| 2018/0089572 A1* | 3/2018 | Aili | G06F 40/30 |
| 2018/0121787 A1* | 5/2018 | Hashimoto | G06N 3/04 |
| 2018/0121788 A1* | 5/2018 | Hashimoto | G06F 40/284 |
| 2018/0144264 A1* | 5/2018 | Ranzato | G06N 20/00 |
| 2018/0247221 A1* | 8/2018 | Park | G06N 20/00 |
| 2018/0286386 A1* | 10/2018 | Baughman | G10L 15/063 |
| 2018/0307675 A1* | 10/2018 | Akkiraju | G06N 20/00 |
| 2019/0079724 A1* | 3/2019 | Feuz | H04W 4/12 |
| 2019/0333510 A1* | 10/2019 | Akkiraju | G06F 40/35 |
| 2020/0042642 A1* | 2/2020 | Bakis | G06F 16/243 |

* cited by examiner

HYBRID NLP SCENARIOS FOR MOBILE DEVICES

BACKGROUND

Conventional natural language processing (NLP) platforms facilitate the creation of dialog flow-based applications. Such applications may receive voice or text input parameters and perform specified actions in response thereto. The actions may be implemented using Application Programming Interface (API) calls to other applications.

These NLP platforms are only available online. Therefore, a mobile device which is not network-connected is unable to submit input parameters to a platform or receive a response therefrom. Mobile platforms (e.g., iOS, Android) have recently included libraries for native NLP processing, but applications using these libraries require device-specific coding. Such an application would also restrict the NLP environment to the specific mobile scenario in which it is deployed.

Systems are desired to provide offline NLP processing while leveraging benefits provided by an online NLP platform.

DETAILED DESCRIPTION

The following description is provided to enable any person in the art to make and use the described embodiments and sets forth the best mode contemplated for carrying out the described embodiments. Various modifications, however, will remain apparent to those in the art.

Embodiments may provide technical improvements over existing systems by efficiently creating and handling NLP machine learning metadata. For example, a dialog flow may be designed using an NLP platform and provisioned as a mobile application for execution on a mobile platform (e.g. iOS, Android). The mobile application may then implement the dialog flow as an NLP model using machine learning libraries provided by the mobile platform.

Moreover, according to some embodiments, the mobile application logs the transactional data created when the mobile device is offline. Some of this transactional data may include transactions which failed because one or more of the user intents were not recognized, or data indicating a number of times each dialog path was followed. Once back online, the library on the mobile device may synchronize the logged data with the NLP platform. This data, as well as similar data from mobile devices executing a same or different mobile platform, may be used for automated retraining and/or for manually implementing changes to the dialog flow.

Figure 1:
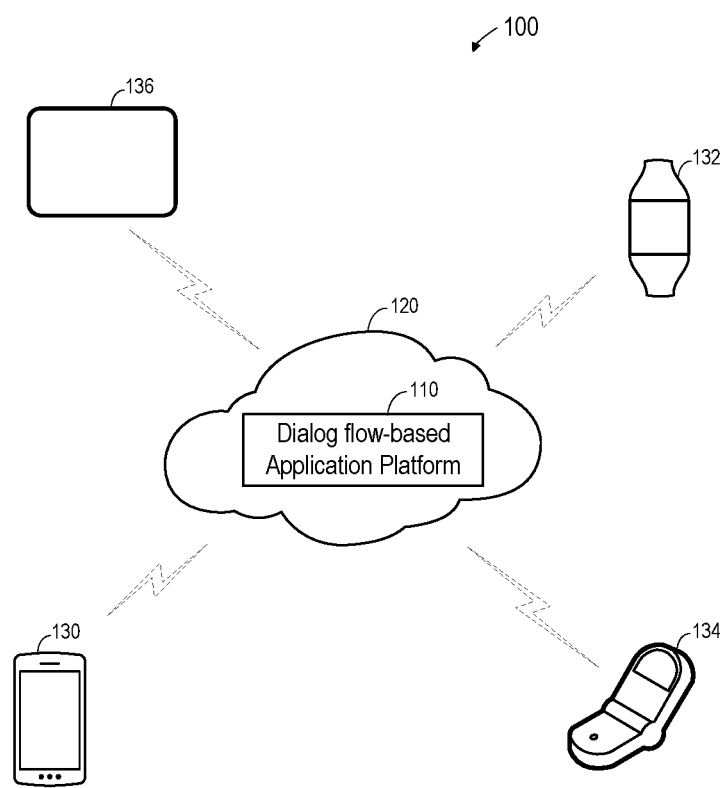
FIG. 1 is a block diagram of a system supporting hybrid online and offline NLP processing according to some embodiments.

FIG. 1 is a block diagram of system 100 according to some embodiments. System 100 includes dialog flow-based application platform 110 deployed within network 120. Network 120 is depicted as a cloud-based network but embodiments are not limited thereto. For example, network 120 may include any number of public or private networks implementing any number or type of networking protocols over any number or type of network infrastructure.

Dialog-flow based application platform 110 may comprise any platform for designing and/or executing dialog flow-based applications. Such applications may issue API calls to other applications or services (not shown) provided by network 120. Application platform 110 may provide a graphics-based or any other design metaphor for application design that is or becomes known. Application platform 110 may also be capable of provisioning a designed application in any number of formats, including mobile platform-compatible formats (e.g., iOS, Android). According to some embodiments, platform 110 provides an API to extract relevant metadata for machine learning on a mobile platform.

Mobile devices 130, 132, 134 and 136 may be occasionally connected to network 120 and may operate in online or offline modes depending on their connection state. Mobile devices 130, 132, 134 and 136 may execute a same operating system or different operating systems. For example, device 130 may execute an Android operating system and device 132 may execute an iOS operating system. In such a case, application platform 110 may provide a same application to each of devices 130 and 132, albeit in an appropriate platform-specific format. The application may include a trained NLP model for execution by devices 130 and 132, perhaps using libraries provided by the respective mobile platforms.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

Figure 2:
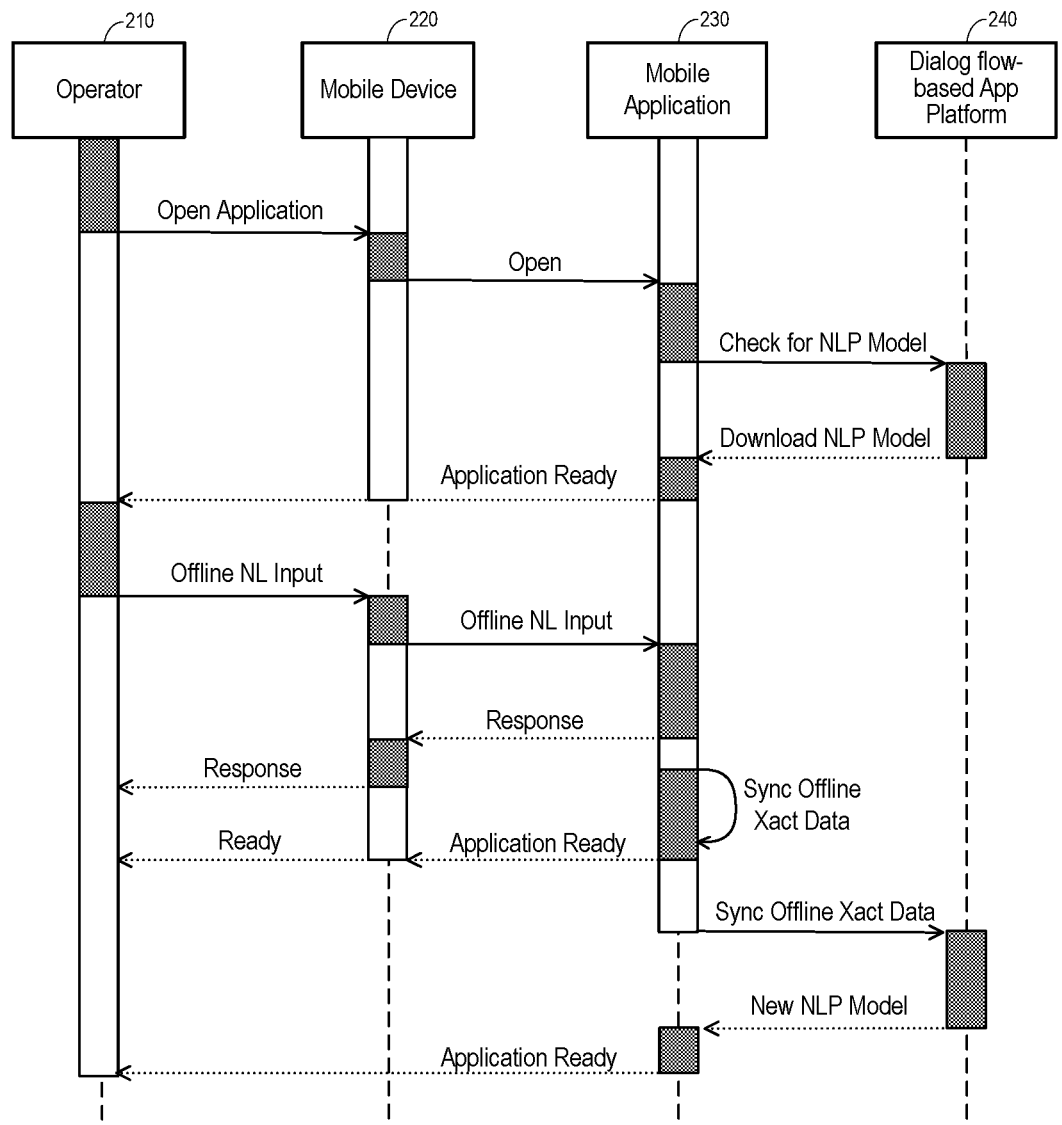
FIG. 2 is a sequence diagram of a process to support hybrid online and offline NLP processing according to some embodiments.

FIG. 2 is a sequence diagram of a process according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a CD, a DVD, a Flash drive, or a magnetic tape. Embodiments are not limited to the examples described below.

Initially, operator 210 operates mobile device 220 to open mobile application 230 residing on mobile device 220 as is known in the art. Mobile application 230 may comprise a standalone application or a client application which provides offline and online operation. For example, mobile application 230 may comprise a client application usable by field technicians to enter data associated with customers and equipment repairs even when mobile device 220 is not networked-connected, and to synchronize such data with a central backend service when a network connection is re-established.

Mobile device 220 opens mobile application 230 in response to receiving the command to open mobile application 230. It will be assumed that mobile device 220 is initially network-connected. Accordingly, mobile application 230 checks dialog flow-based application platform 240 for an associated NLP model. As mentioned above, the NLP model may comprise a machine learning-trained model executable by mobile device 220 to call services of mobile application 230 based on voice or text input parameters.

Mobile application 230 downloads the NLP model from platform 240 and operator 210 is notified that application 230 is ready for input. It will be assumed that mobile device 220 is now offline. In the offline state, operator 210 provides natural language input to an input device (e.g., a microphone, a keyboard) of mobile device 220. The input is provided to mobile application 230, which executes the NLP model to call APIs of application 230 according to the designed flow, and to thereby provide a response to operator 210 via mobile device 220. The response may include an error, for example in a case that the NLP model failed to recognize an intent of the original NL input.

In addition to providing a response, mobile application 230 also synchronizes transaction data describing the prior input/response transaction with an offline data store (not shown) of mobile device 220. The offline data store may include transaction data of any number of prior transactions. According to some embodiments, the foregoing input/response/offline sync pattern is repeated any number of times until it is determined that a network connection has been established between mobile application 230 and platform 240 (i.e., mobile device 220 is online).

Mobile application 230 synchronizes the offline transaction data with platform 240 when connected thereto. For example, mobile application 230 may call a Web Service exposed by platform 240 to exchange the transaction data. As mentioned above, the transaction data may describe offline transactions between operator 210 and mobile application 230. The transaction data may indicate failed transactions as well as details of successful transactions (e.g., how often a particular flow path was traversed). Platform 240 may use this information to retrain the NLP model using machine learning techniques and/or to modify the dialog flow embodied by the NLP model.

The resulting new NLP model is transmitted to mobile application 230. The new NLP model may be transmitted after several online/offline iterations as described above. Once transferred, mobile application 230 may utilize the new NLP model as described above with respect to the prior NLP model.

Figure 3A:
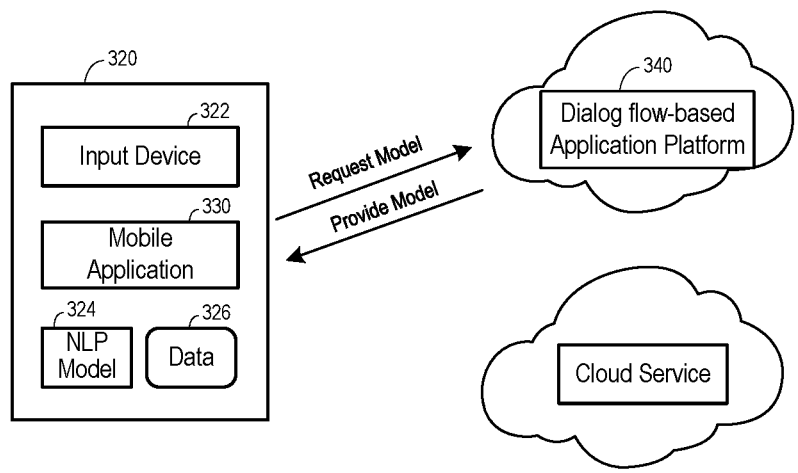
FIG. 3a illustrates reception of a mobile-compatible NLP model according to some embodiments.
Figure 3B:
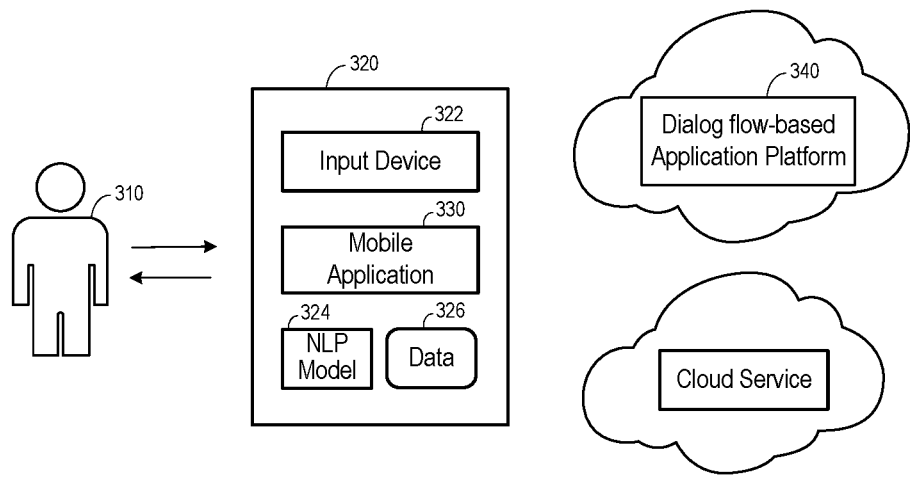
FIG. 3b illustrates offline NLP processing according to some embodiments.
Figure 3C:
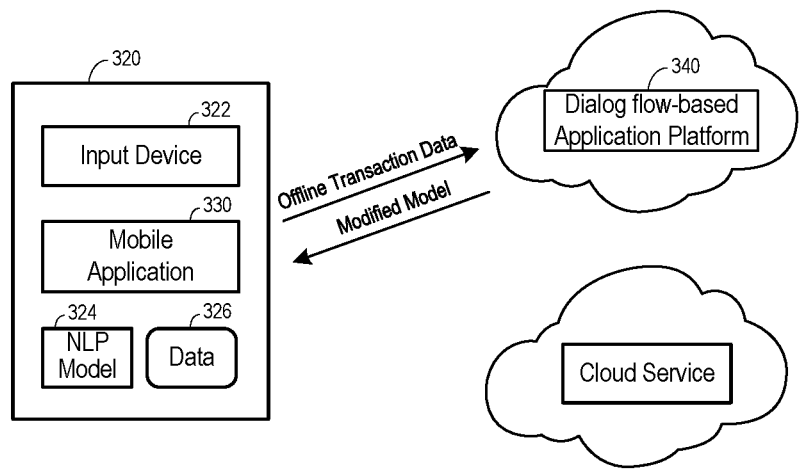
FIG. 3c illustrates uploading of transaction data and receipt of a retrained mobile-compatible NLP model according to some embodiments.

FIGS. 3a through 3c illustrate an example of sequence 200 according to some embodiments. Specifically, mobile device 320 requests and receives a trained NLP model from platform 340. According to some embodiments, device 320 receives metadata from platform 340 and trains NLP model 326 based on the metadata.

FIG. 3b illustrates the inputting of parameters to mobile device 320 by operator 310 while in offline mode. These parameters may comprise text and/or voice parameters received by input device 322 of mobile device 320 and passed to mobile application 330. Mobile application 330 may submit the input parameters to NLP model 324 stored on device 320, which in turn may call APIs provided by mobile application 330 or another application residing on mobile device 320.

Data 326 may store any suitable data generated during execution of mobile application 330. The generated data may include data associating the input parameters with intents determined therefrom, data indicating any errors or processing failures, statistical data associated with execution branches or performance of mobile application 330, or any other suitable data. Mobile application 330 may store this data periodically and/or in response to any suitable trigger.

FIG. 3c illustrates transmission of offline transaction data to platform 340 once mobile application 330 resumes online operation. As described above, platform 340 may use this information to retrain the NLP model using machine learning techniques and/or to modify the dialog flow embodied by the NLP model. FIG. 3c also illustrates transmission of the modified NLP model from platform 340 to mobile device 320. Such transmission may occur well after transmission of the offline transaction data.

Figure 4:
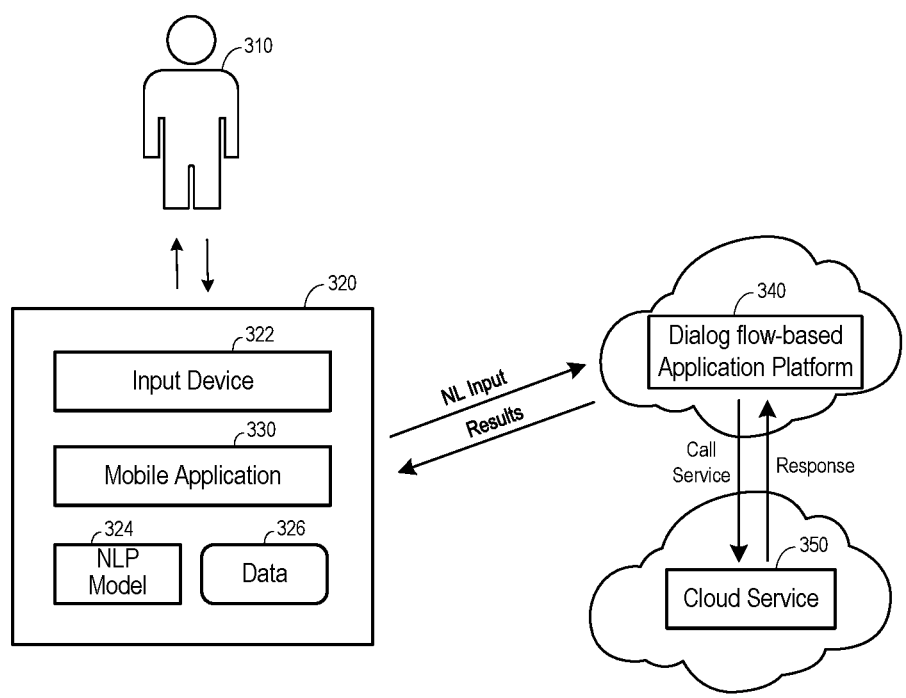
FIG. 4 illustrates offline NLP processing according to some embodiments.

FIG. 4 illustrates online operation according to some embodiments. As shown, mobile device 320 is in communication with application platform 340. Operator 310 provides input parameters (e.g., text, speech) to input device 322 of mobile device 320. Mobile application 330 receives the input parameters and, unlike the previously-described offline operation, transmits the input parameters to a service provided by platform 340. The service executes a dialog flow, for example by inputting the input parameters to a trained NLP model implementing the flow.

Execution of the dialog flow may cause platform 340 to call cloud service 350 as shown. In this regard, cloud service 350 may comprise a cloud implementation of mobile application 330. Service 350 provides a response to platform 340, which forwards a corresponding result to mobile application 330. Execution of a complete dialog flow may include several of such roundtrips. In some embodiments, cloud service 350 provides a response directly to mobile application 330.

Figure 5:
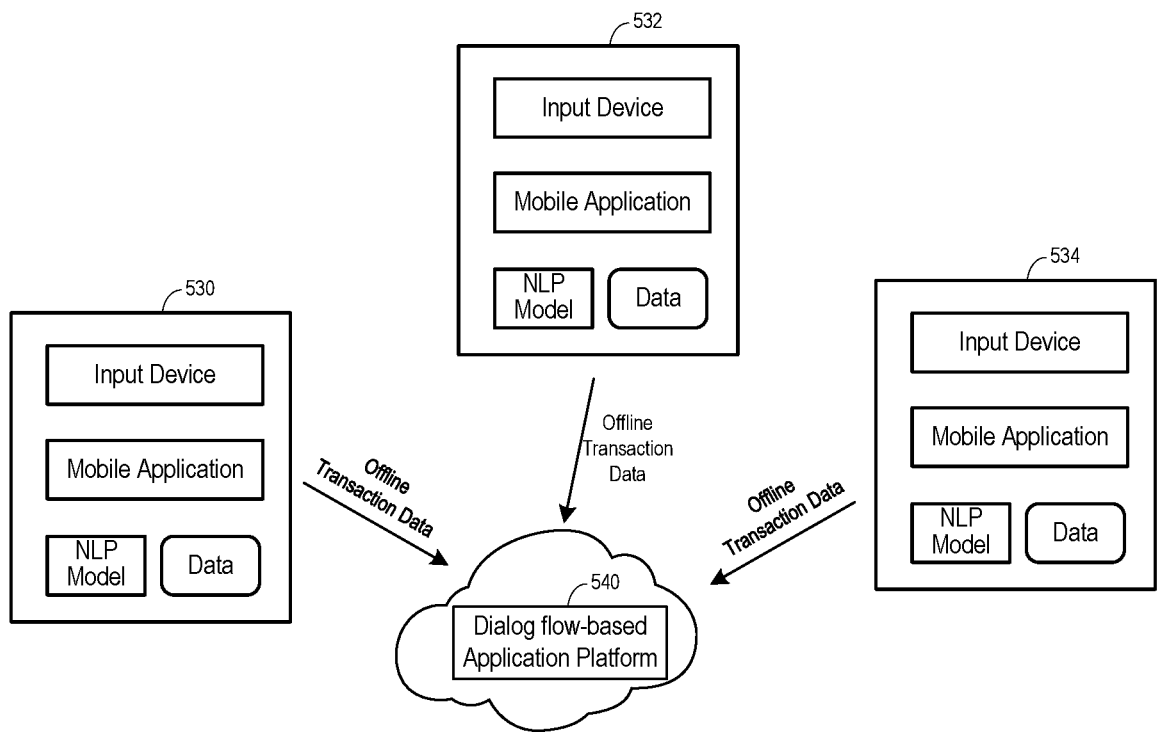
FIG. 5 illustrates uploading of offline transaction data to an online NLP platform from a plurality of sporadically-offline mobile devices according to some embodiments.

FIG. 5 illustrates uploading of offline transaction data to an online NLP platform from a plurality of sporadically-offline mobile devices according to some embodiments. Specifically, each of mobile devices 530, 532 and 534 may operate as described above with respect to FIG. 2 and FIGS. 3a through 3c to provide stored offline transaction data to platform 540. Collection of the offline transactional data and provision thereof to platform 540 need not be contemporaneous. Each mobile device 530, 532 and 534 may provide data to platform 540 at a different time.

Figure 6:
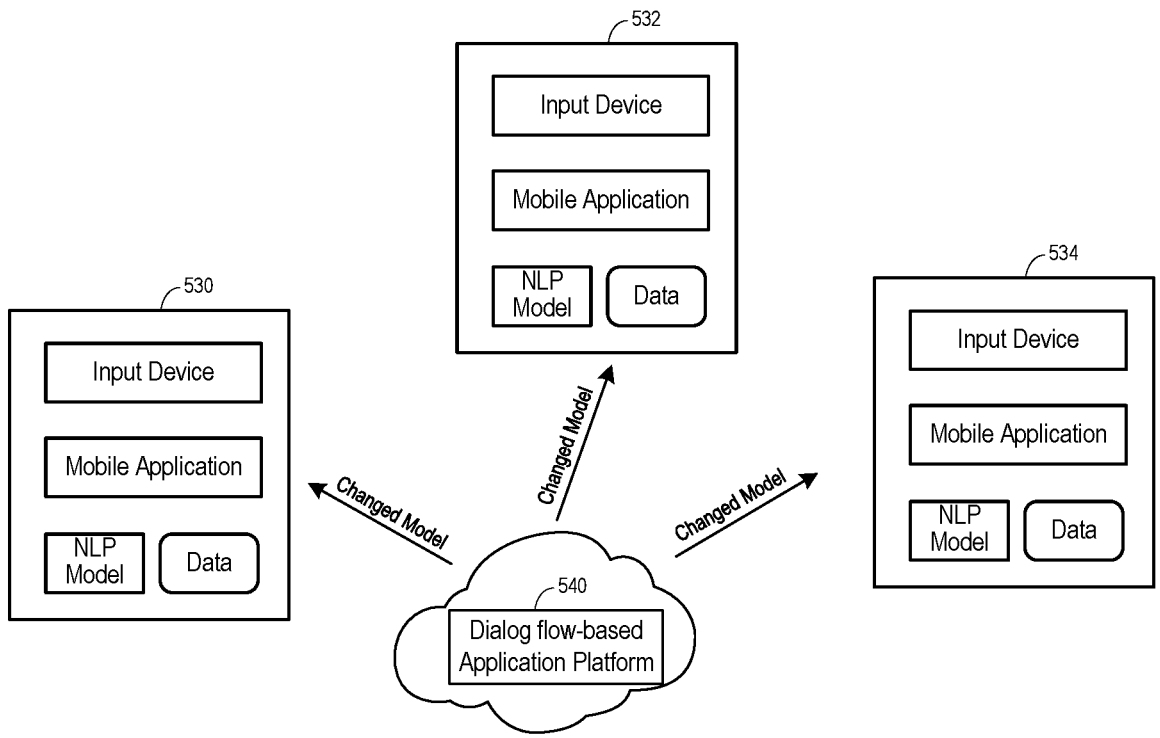
FIG. 6 illustrates downloading of mobile platform-specific NLP models retrained based on offline transaction data received from a plurality of sporadically-offline mobile devices according to some embodiments.

FIG. 6 illustrates downloading of a changed NLP model to each of devices 530 through 534 according to some embodiments. As described above, the changed model may be a model which has been retrained based on some or all of the offline transactional data received from one or more devices as shown in FIG. 5. Accordingly, embodiments may provide improved modelling based on offline transaction generated by and transmitted from several mobile devices.

Moreover, one or more of mobile devices 530, 532 and 534 may execute different operating systems. Accordingly, embodiments allow collection of transactional data from various platforms. The changed models returned to the devices as shown in FIG. 6 are similarly compatible with the platform for which they are intended.

Figure 7:
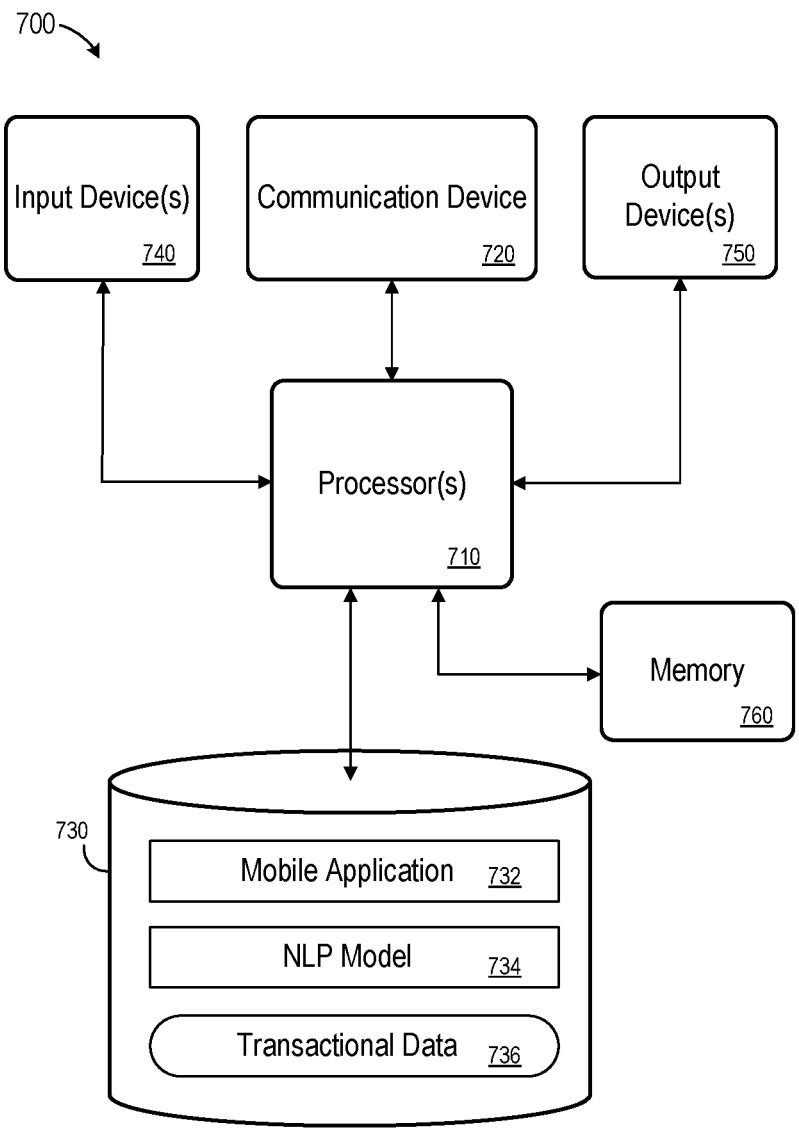
FIG. 7 is a block diagram of a mobile device according to some embodiments.

FIG. 7 is a block diagram of mobile device 700 according to some embodiments. Device 700 may comprise a general-purpose computing apparatus and may execute program code to perform any of the functions described herein.

Device 700 may comprise an implementation of any mobile devices described above. Device 700 may include other unshown elements according to some embodiments.

Mobile device 700 includes processor(s) 710 operatively coupled to communication device 720, data storage device 730, one or more input devices 740, one or more output devices 750 and memory 760. Communication device 720 may comprise one or more wired and/or wireless interfaces to facilitate communication with an external network and external devices, such as a data storage device. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter voice or text input parameters into device 700. Output device(s) 750 may comprise, for example, a display (e.g., a display screen), a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Mobile application 732 and NLP model 734 each comprise program code executed by processor(s) 710 to cause server 700 to perform any one or more of the processes described herein. Execution may be assisted using libraries provided by an operating system of device 700 (not shown). Embodiments are not limited to execution of these processes by a single computing device.

Transactional data 736 may include offline transactional data as described herein. Data 736 may include other data downloaded from a platform and used to train NLP model 734 as described above. Data storage device 730 may also store data and other program code for providing additional functionality and/or which are necessary for operation of server 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Those in the art will appreciate that various adaptations and modifications of the above-described embodiments can be configured without departing from the claims. Therefore, it is to be understood that the claims may be practiced other than as specifically described herein.

What is claimed is:

1. A mobile apparatus comprising:
a communication device to communicate with a remote system;
an input device to receive input parameters from an operator;
a local memory; and
a processor to execute processor-executable process steps to cause the mobile apparatus to:
receive, from the remote system via the communication device, a trained natural language processing (NLP) model implementing a dialog flow-based application;
provide the input parameters received via the input device to the trained NLP model to initiate an execution of a dialog while the mobile apparatus is not in communication with the remote system;
store transaction data associated with the execution of the dialog in the local memory of the mobile apparatus;
determine that the mobile apparatus is in communication with the remote system;
transmit, in response to the determination that the mobile apparatus is in communication with the remote system, the stored transaction data to the remote system via the communication device; and
receive, from the remote system, an updated trained NLP model that is trained based on the transaction data transmitted to the remote system.

2. A mobile apparatus according to claim 1, wherein the transaction data comprises an error message and includes the input parameters.

3. A mobile apparatus according to claim 2, wherein transmission of the transaction data comprises transmission of data associated with other instances of offline mode dialogs.

4. A mobile apparatus according to claim 1, wherein transmission of the transaction data comprises transmission of data associated with other instances of offline mode dialogs.

5. A mobile apparatus according to claim 1, wherein the processor is to execute processor-executable process steps to cause the system to:
in an offline mode:
generate an output from the trained NLP model based on the input parameters; and
provide a response to the operator based on the generated output.

6. A mobile apparatus according to claim 5, wherein the generated output comprises an Application Programming Interface call to an application executed by the processor.

7. A mobile apparatus according to claim 1, wherein the mobile apparatus executes a first operating system and the updated trained NLP model is trained based on the transmitted transaction data by the mobile apparatus and data transmitted to the remote system by a second mobile apparatus executing a second operating system.

8. A method for a mobile device, the method comprising:
receiving, from a remote system, a trained natural language processing (NLP) model to implement dialog flow-based application;
receiving input parameters from an operator while not in communication with the remote system;
providing the input parameters to the trained NLP model to initiate an execution of a dialog by the dialog flow-based application;
storing transaction data associated with the execution of the dialog in a local memory;
determining that the mobile device is in communication with the remote system;

transmitting, in response to the determination that the mobile device is in communication with the remote system, the stored transaction data to the remote system; and receiving, from the remote system, an updated trained NLP model that is trained based on the transmitted transaction data.

9. A method according to claim 8, wherein the transaction data comprises an error message and includes the input parameters.

10. A method according to claim 8, further comprising:
receiving second input parameters from the operator while not in communication with the remote system;
inputting the second input parameters to the trained NLP model to initiate an execution of a second dialog by the dialog flow-based application; and
storing second transaction data associated with the second dialog in the local memory.

11. A method according to claim 10, further comprising transmitting the second transaction data to the remote system.

12. A method according to claim 8, further comprising:
generating an output from the trained NLP model based on the input parameters; and
providing a response to the operator based on the generated output.

13. A method according to claim 12, wherein the output comprises an Application Programming Interface call to an application executed by the mobile device.

14. A method according to claim 8, wherein the mobile device executes a first operating system, the updated trained NLP model is trained based on the transmitted transaction data and second transaction data transmitted to the remote system by a second mobile device executing a second operating system.

15. A system comprising:
an online application platform to generate a first trained NLP model of a natural language dialog flow and a second trained NLP model of the natural language dialog flow, the first trained NLP model for execution by a first operating system and the second trained NLP model for execution by a second operating system;
a first mobile device comprising a first local memory and executing the first operating system, the first mobile device to:
receive the first trained NLP model from the online application platform;
receive input parameters from a first operator;
input the input parameters to the first trained NLP model to initiate an execution of a first dialog;
store first transaction data associated with the execution of the first dialog in the first local memory; and
transmit the stored first transaction data to the online application platform; and a second mobile device comprising a second local memory and executing the second operating system, the second mobile device to:
receive the second trained NLP model from the application platform;
receive second input parameters from a second operator;
input the second input parameters to the second trained NLP model to initiate an execution of a second dialog;
store second transaction data associated with the execution of the second dialog in the second local memory; and
transmit the second transaction data to the online application platform,
wherein the online application platform is to update the first trained NLP model and the second trained NLP model based on the first transaction data and the second transaction data.

16. A system according to claim 15, wherein the first transaction data comprises an error message and includes the input parameters to the first trained model.

17. A system according to claim 15, wherein updating the first trained NLP model and the second trained NLP model comprises retraining the first trained NLP model based on the first transaction data and the second transaction data and retraining the second trained NLP model based on the first transaction data and the second transaction data.

18. A system according to claim 15, wherein updating the first trained NLP model and the second trained NLP model comprises updating the natural language dialog flow based on the first transaction data and the second transaction data.

19. A system according to claim 15, the first mobile device to further:
generate a first output from the first trained NLP model based on the input parameters to the first trained model; and
provide a response to the first operator based on the generated first output; and the second mobile device to further:
generate a second output from the second trained NLP model based on the second input parameters to the second trained model; and
provide a second response to the second operator based on the generated second output.

20. A system according to claim 19, wherein the first output comprises a first Application Programming Interface call to a first application executed by the first mobile device, and
wherein the second output comprises a second Application Programming Interface call to a second application executed by the second mobile device.

* * * * *